(12) United States Patent  
Nihei et al.

(10) Patent No.: US 9,183,492 B2
(45) Date of Patent: Nov. 10, 2015

(54) COMPOSITE IC CARD

(71) Applicant: TOPPAN PRINTING CO., LTD., Tokyo (JP)

(72) Inventors: Hiroshige Nihei, Tokyo (JP); Tetsuya Tsukada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/255,534

(22) Filed: Apr. 17, 2014

(65) Prior Publication Data

US 2014/0224886 A1 Aug. 14, 2014

Related U.S. Application Data

(63) Continuation of application No. PCT/JP2012/079992, filed on Nov. 19, 2012.

(30) Foreign Application Priority Data

Nov. 17, 2011 (JP) ................................. 2011-251437

(51) Int. Cl.
*G06K 19/06* (2006.01)
*G06K 19/077* (2006.01)
*H01Q 7/00* (2006.01)
(Continued)

(52) U.S. Cl.
CPC .... *G06K 19/07783* (2013.01); *G06K 19/07769* (2013.01); *G06K 19/07794* (2013.01); *H01Q 1/2225* (2013.01); *H01Q 1/40* (2013.01); *H01Q 7/00* (2013.01)

(58) Field of Classification Search
USPC ................................. 235/492, 451, 487, 488
See application file for complete search history.

(56) References Cited

U.S. PATENT DOCUMENTS 5,955,723 A 9/1999 Reiner
6,378,774 B1 * 4/2002 Emori et al. .................. 235/492
(Continued)

FOREIGN PATENT DOCUMENTS

EP 0 977 145 A2 2/2000
EP 1 031 939 A1 8/2000
(Continued)

OTHER PUBLICATIONS

International Search Report mailed Dec. 18, 2012 in corresponding International Patent Application No. PCT/JP2012/079992.
Extended European Search Report dated May 19, 2015 in corresponding European Patent Application No. 12849250.1.

*Primary Examiner* — Ahshik Kim

(57) ABSTRACT

Provided is a composite IC card including: a card base having a recess; an antenna sheet arranged inside the card base; an IC module arranged in the recess of the card base. The IC module includes an IC chip having a module substrate provided with an external terminal, and a first coupling coil. The antenna sheet includes an antenna coil configured to perform reception of electric power and transmission and reception of signals with an external reader, and a second coupling coil connected to the antenna coil. The first coupling coil and the second coupling coil are arranged so as to be capable of achieving close coupling therebetween and configured to couple the IC module with the antenna sheet in a non-contact manner by trans coupling. The second coupling coil of the antenna sheet is arranged outside a region in which the recess of the card base is formed.

6 Claims, 8 Drawing Sheets

(51) Int. Cl.
*H01Q 1/40* (2006.01)
*H01Q 1/22* (2006.01)

(56) References Cited

U.S. PATENT DOCUMENTS

2012/0037710 A1* 2/2012 Le Garrec et al. ............ 235/492
2014/0014732 A1* 1/2014 Finn et al. .................... 235/492

FOREIGN PATENT DOCUMENTS

| EP | 2 045 872 A1 | 4/2009 |
| JP | 2009-520250 | 5/2009 |
| WO | WO 96/35190 A1 | 11/1996 |
| WO | WO 98/15926 A1 | 4/1998 |
| WO | WO 99/26195 A1 | 5/1999 |
| WO | WO 2007/066267 A2 | 6/2007 |

* cited by examiner

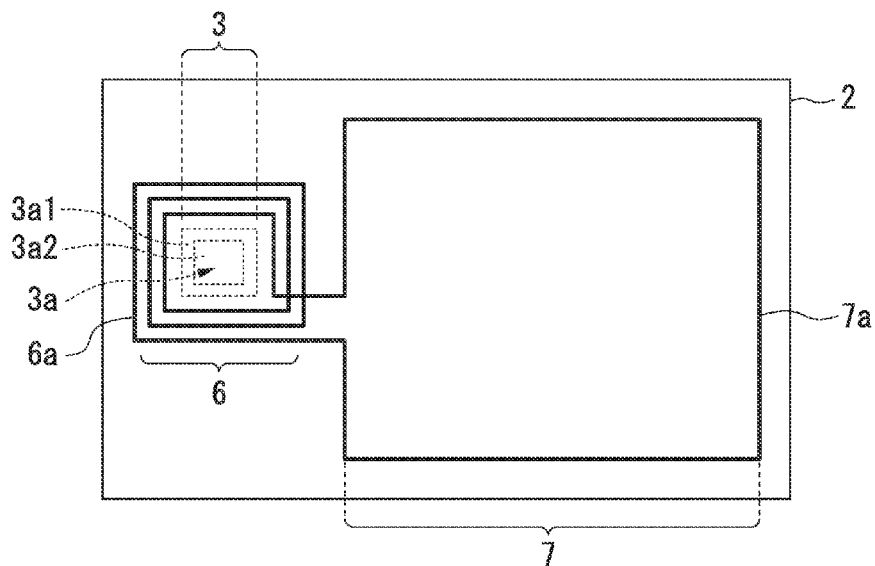
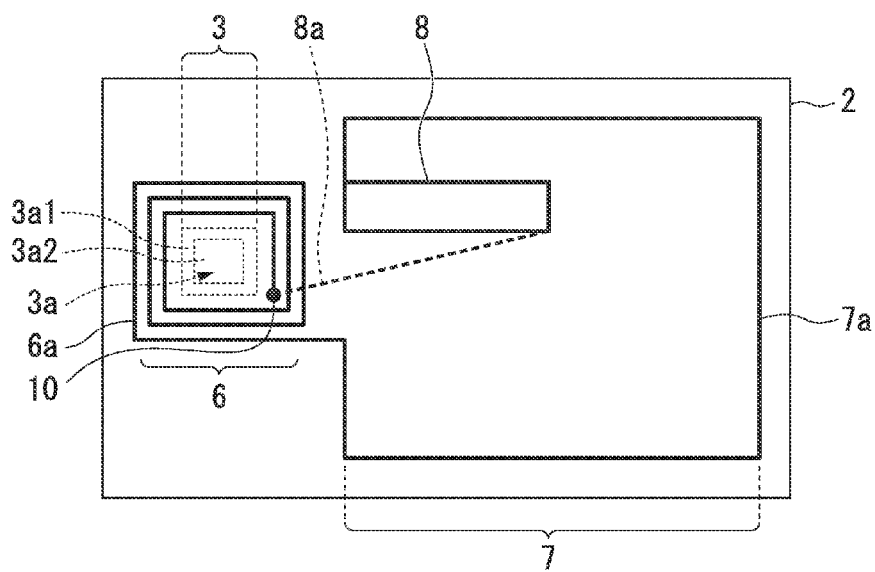

COMPOSITE IC CARD

CROSS REFERENCE TO RELATED APPLICATIONS

This application is a continuation application based on a PCT Patent Application No. PCT/JP2012/079992, filed Nov. 19, 2012, whose priority is claimed on Japanese Patent Application No. 2011-251437, filed Nov. 17, 2011, the entire content of which are hereby incorporated by reference.

BACKGROUND OF THE INVENTION

1. Field of the Invention

The present invention relates to a composite IC card which is operable in both: a contact mode used to perform, for example, reception of electric power from an electric power supply and transmission and reception of signals via electric contacts; and a non-contact mode used to perform, for example, reception of electric power from an electric power supply and transmission and reception of signals by electromagnetic coupling in a non-contact manner without electric contacts in the IC card, and method of manufacturing the same.

2. Description of the Related Art

As an IC card having a built-in semiconductor memories and the like, a composite IC card (dual IC card) is known which is operable in both a contact mode and a non-contact mode. As an example, there is a composite IC card in which an antenna coil provided inside a card used to perform a non-contact communication with external terminals is physically connected by wiring to an IC module which is operable in both a contact mode and a non-contact mode.

In addition, there is a composite IC card in which a coil is formed in an IC module which is operable in both a contact mode and a non-contact mode, and a coil used to make an electrical coupling with the coil formed in the IC module in a non-contact manner and an antenna coil used to perform a non-contact communication with external terminals are provided inside the card (refer to WO 99/26195, WO 98/15926, and WO 96/35190).

In the latter composite IC card, it is unnecessary to physically connect the IC module and the antenna coil with wiring and defects such as a loose connection are unlikely to be caused, which leads to its increased demand recently. This type of IC card is obtained by fabricating a card base having a built-in antenna coil and a coil used to make an electrical connection with an IC module, forming a recess in the card base by milling which is used to embed the IC module, and then embedding and arranging the IC module in the recess.

When forming the recess in the card base, depending on the accuracy of the processing machine and the position of the coil used to make an electrical connection with the IC module, it is possible to cause disconnection and deformation of the coil.

For a composite IC card in which an IC module configured to be operated in both a contact mode and a non-contact mode and including a coil, a coil used to make an electrical coupling with the coil formed in the IC module in an non-contact manner, and an antenna coil used to perform a non-contact communication with external terminals are provided in the card base, the object of the present invention is to provide a composite IC card which makes it possible to reduce defectiveness due to disconnection, deformation, and the like of the coil used to make an electrical connection with the coil of the IC module.

SUMMARY OF THE INVENTION

In order to solve the above-described issues, a composite IC card according to an aspect of the present invention includes: a card base having a recess; an antenna sheet arranged inside the card base; an IC module arranged in the recess of the card base, in which the IC module includes an IC chip having both a contact communication function and a non-contact communication function, a module substrate provided with an external terminal which is a contact communication element, and a first coupling coil which is a non-contact communication mechanism, the antenna sheet includes an antenna coil configured to perform reception of electric power and transmission and reception of signals with an external reader, and a second coupling coil connected to the antenna coil, the first coupling coil and the second coupling coil are arranged so as to be capable of achieving close coupling therebetween and configured to couple the IC module with the antenna sheet in a non-contact manner by trans coupling, and the second coupling coil of the antenna sheet is arranged outside a region in which the recess of the card base is formed.

It may be arranged such that the second coupling coil is formed from a coil having a plurality of turns, and the innermost turn of the coil is greater in line width than the other turns of the coil.

It may be arranged such that the antenna sheet further includes a capacitive element connected to the second coupling coil and the antenna coil.

It may be arranged such that the second coupling coil is formed on a front surface of the antenna sheet, the antenna sheet further includes a connection land connecting the second coupling coil with a wiring formed on a rear surface of the antenna sheet and drawn from the capacitive element, and the connection land is arranged inside the region in which the recess of the card base is formed.

It may be arranged such that the recess of the card base is constituted by a first recess formed in the vicinity of a surface of the card base and a second recess communicating with the first recess and being less in opening width than the first recess, and the connection land is arranged between a side wall of the first recess and a side wall of the second recess.

It may be arranged such that the width of the connection land is greater than the line width of the second coupling coil in a plan view.

It may be arranged such that the antenna sheet is arranged in a position deeper than a bottom face of the recess of the card base.

According to some aspects of the present invention, it is possible to reduce the defectiveness due to disconnection, deformation, and the like of the coil used to make an electrical connection with the coil of the IC module.

BRIEF DESCRIPTION OF THE DRAWINGS

FIG. 4 is a plan view schematically showing an example of an antenna sheet according to an embodiment of the present invention.

FIG. 5 is a plan view schematically showing another example of an antenna sheet according to an embodiment of the present invention.

DETAILED DESCRIPTION OF THE PREFERRED EMBODIMENTS

Hereinafter, composite IC cards according to embodiments of the present invention will be explained with reference to the drawings.

First, the basic structure and principles of the non-contact communication mechanism will be explained.

Figure 10:
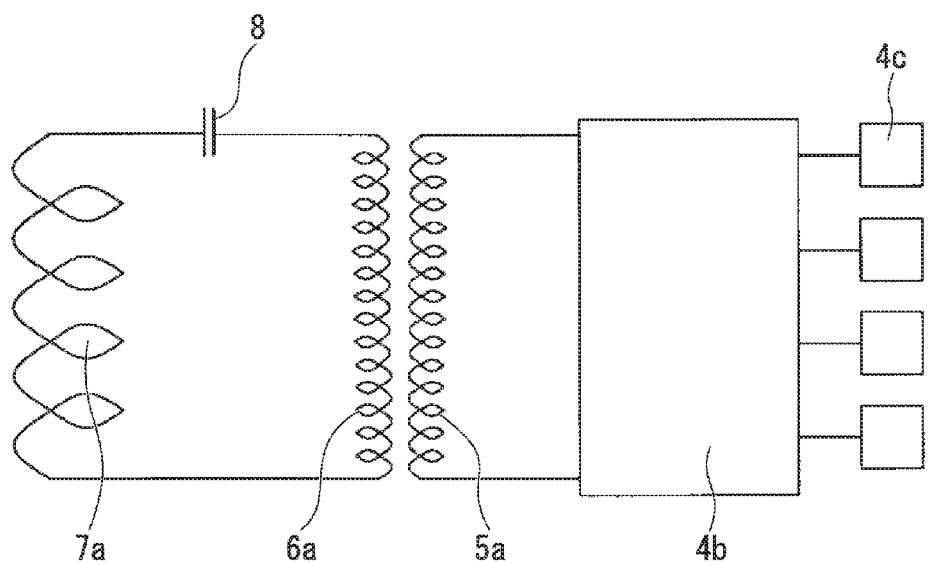
FIG. 10 is an equivalent circuit schematic showing a non-contact coupling circuit and illustrating the principles of the non-contact communication mechanism in a composite IC card according to an embodiment of the present invention.

FIG. 10 is an equivalent circuit schematic showing an example of a non-contact coupling circuit and illustrating the principles of the non-contact communication mechanism. A transceiver coil being an electromagnetic coupler, used to perform electric power supply to a non-contact communication mechanism of a composite IC card and transmission and reception of information, is connected to a transceiver circuit of an external read/write device (reader) (not shown in the figures) for use in a non-contact mode.

The non-contact communication mechanism of the composite IC card includes an antenna coil 7a, a capacitive element 8 which is connected to both ends of the antenna coil 7a to form a parallel-resonant circuit, a composite IC chip 4b mounted to a composite IC module 4, a first coupling coil 5a connected to the composite IC chip 4b, and a second coupling coil 6a. The antenna coil 7a is directly electromagnetically coupled to a transceiving antenna of the external read/write device and involved in reception of electric power as well as transmission and reception of information. The second coupling coil 6a is arranged so as to closely couple to the first coupling coil 5a used to transmit signals received by the antenna coil with maximum efficiency and is connected to the capacitive element 8 which constitutes a parallel-resonant circuit.

The second coupling coil 6a and the capacitive element 8 are mutually connected at a connection land 10 as shown in FIGS. 5, 6, 11A, and 11B. In the examples shown in the figures, the second coupling coil 6a formed in the front surface 2a of the antenna sheet 2 and a wiring 8a which is formed in the rear surface 2b of the antenna sheet 2 and drawn from the capacitive element 8 are mutually connected at the connection land 10 formed in the front surface 2a of the antenna sheet 2. More specifically, when mechanically depressing the connection land 10 formed in the front surface 2a of the antenna sheet 2 for example, it will be possible to physically connect the second coupling coil 6a formed in the front surface 2a of the antenna sheet 2 with the wiring 8a formed in the rear surface 2b of the antenna sheet 2. It may also be possible to weld the second coupling coil 6a with the wiring 8a of the capacitive element 8 by irradiating laser light to the connection land 10. The other methods may be suitably employed for the above-described connection.

In the examples shown in the figures, although the second coupling coil 6a is formed in the front surface 2a of the antenna sheet 2 and the wiring 8a of the capacitive element 8 is formed in the front surface 2a of the antenna sheet 2, the positional relationship between these elements is not limited to the above examples and it may be possible to employ a suitable arrangement in accordance with the characteristics required for the IC card.

Figure 6:
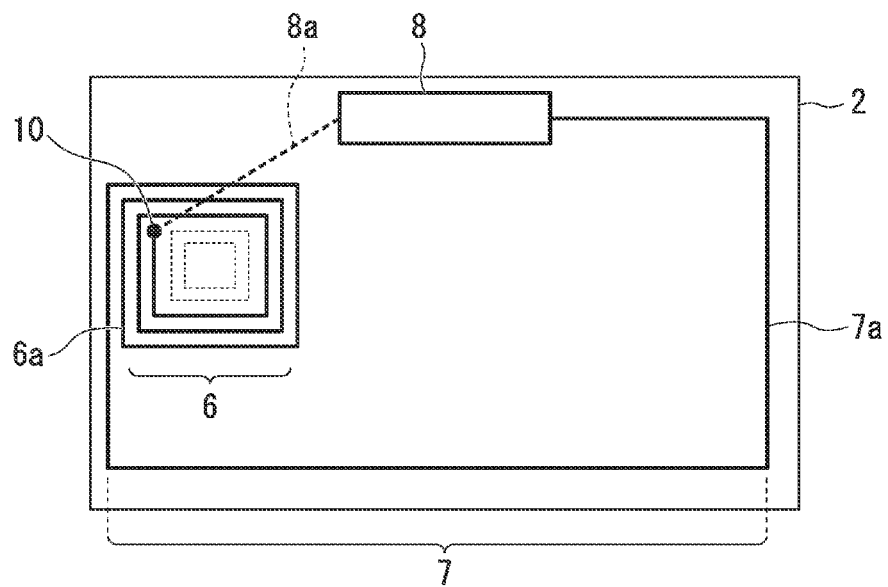
FIG. 6 is a plan view schematically showing another example of an antenna sheet according to an embodiment of the present invention.

The capacitive element 8 and the antenna coil 7a are connected in series in the examples shown in FIGS. 5 and 6, but the capacitive element 8 may be arranged between and connected in parallel with the antenna coil 7a and the second coupling coil 6a. Alternatively, the capacitive element 8 may be eliminated by increasing the line capacity.

The method of transmitting electric power and information from an external read/write device to a composite IC card and coupling of coils used for that will be explained below.

High frequency signals, not shown in the figures, generated in the transceiver circuit of the external read/write device induce high frequency magnetic field in the transceiver coil. The high frequency signals will be emitted into a space as magnetic energy.

Due to the high frequency magnetic field generated in the transceiver coil of the external read/write device, electric current will flow through the parallel-resonant circuit constituted by the antenna coil 7a and the capacitive element 8 of the composite IC card that is placed in the high frequency magnetic field. At this time, electric current due to the high frequency magnetic field will be induced in the first coupling coil 5a directly connected to the composite IC chip 4b and the second coupling coil 6a which is directly connected to the resonant circuit constituted by the antenna coil 7a and the capacitive element 8 and transmits electric power to the first coupling coil 5a. Since the amount of the electric current induced in the first coupling coil 5a and the second coupling coil 6a is more than one order less than the electric current induced in the antenna coil 7a, the receiving sensitivity of the composite IC card is largely dependent on the characteristics of the antenna coil 7a.

Signals received by the resonant circuit constituted by the antenna coil 7a and the capacitive element 8 will transmit to the second coupling coil 6a. After that, because the second coupling coil 6a and the first coupling coil 5a are arranged so as to make a close coupling which achieves maximum communication efficiency, the trans coupling between the second coupling coil 6a and the first coupling coil 5a will allow the signals to transmit to the composite IC chip 4b. The maximum communication efficiency of the trans coupling between the second coupling coil 6a and the first coupling coil 5a is determined by a selected circuit constant.

In this way, the improvement of the receiving characteristics is achieved. As described above, because the characteristics of the antenna coil 7a determines the receiving sensitivity of the composite IC card, the greater area of the antenna coil 7a will be advantageous in receiving sensitivity. The line width (diameter), interval, and number of turns of the antenna coil may be suitably determined in accordance with the characteristics, restrictions on arrangement, and the like of the antenna coil.

The composite IC card according to the present embodiment includes a card base 1 including the antenna sheet 2 which includes the IC module 4, the second coupling coil 6a, and the antenna coil 7a.

The composite IC module 4 includes an IC chip having both contact communication function and non-contact communication function, a module substrate provided with an external terminal which is a contact communication element, and a first coupling coil being a non-contact communication mechanism. More specifically, the composite IC module 4 includes: a composite IC chip 4b including built-in contact interface and non-contact interface; and a module substrate 4a in which patterns of a terminal electrode (external terminal) 4c being a contact communicator (external terminal) and the first coupling coil 5a of the non-contact communicator are formed in different faces from each other.

For the first coupling coil 5a and the antenna coil 7a, a metal thin film pattern formed by etching a metal thin film, so-called a winding coil in which an insulation-coated conductive wire is wound, or a coil made of printed conductive ink may be employed. The composite IC chip 4 is mounted on a face where the first coupling coil 5a of the module substrate 4a is formed. The composite IC chip 4b is connected to a terminal electrode 4c of the module substrate 4a via a through hole.

It is noted that, when arranging the wiring of capacitive element 8 in the front and rear surface of the antenna sheet 2, it is preferable to employ an etching antenna, that is easily formed by etching, as a coil in the second coupling coil region 6 and antenna coil region 7.

In addition, it is preferable that the line width and the interval between adjacent turns of the above-described coil formed by microfabrication such as etching be 0.1 mm or more. In particular, as the second coupling coil 6a of the second coupling coil region 6, it may be possible to employ a coil in which sum of the line width and the interval between adjacent turns of the coil (line and space) be approximately 0.4-0.5 mm.

The composite IC chip 4b and the circuit pattern of the first coupling coil 5a are wire-bonded to form a circuit. The connection between the composite IC chip 4b and the first coupling coil 5a may also be achieved by thermally welding the module substrate 4a to the circuit formation surface of the composite IC chip 4b using solder, conductive adhesive agent, or the like.

After the composite IC chip 4b is mounted to the module substrate 4a and the circuit connection is made, the composite IC chip 4b is sealed with a sealing resin 4d to complete the composite IC module 4.

A composite IC card 100 according to the present embodiment will be manufactured roughly as follows.

First, the flexible antenna sheet 2 is prepared in which the second coupling coil 6a, the antenna coil 7a, and the capacitive element 8 are formed on the sheet base by etching a metal thin film or the like. The second coupling coil 6a and the antenna coil 7a may be formed with a wound insulation-coated conductive wire.

As the sheet base of the antenna sheet 2, vinyl chloride, polyimide, polycarbonate, polyethylene terephthalate (PET), or polyethylene naphthalate (PEN) may be used, for example.

Figure 1:
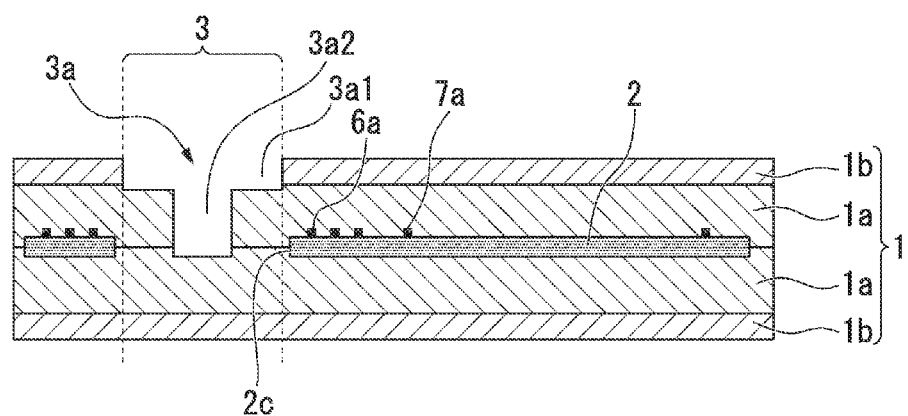
FIG. 1 is a cross-sectional view schematically showing an example of a card base and an antenna sheet of a composite IC card according to an embodiment of the present invention.

Then, the antenna sheet 2 and the card base 1 are laminated together. The card base 1 includes multiple layers. In the example of FIG. 1, the card base 1 includes a pair of core bases 1a and a pair of exterior films 1b arranged on both sides of the core base 1a. The antenna sheet 2 is sandwiched between the core bases 1a and they are integrated by thermal lamination.

As the card base 1, anything may be employed which is capable of giving characteristics required for a card such as sufficient rigidity and embossing suitability, examples thereof including vinyl chloride, amorphous polyester (PETG), and polycarbonate.

After fabricating the card base 1 including the antenna sheet 2, a recess 3a for embedding the composite IC module 4 is formed by milling, cutting work, or the like.

Figure 3A:
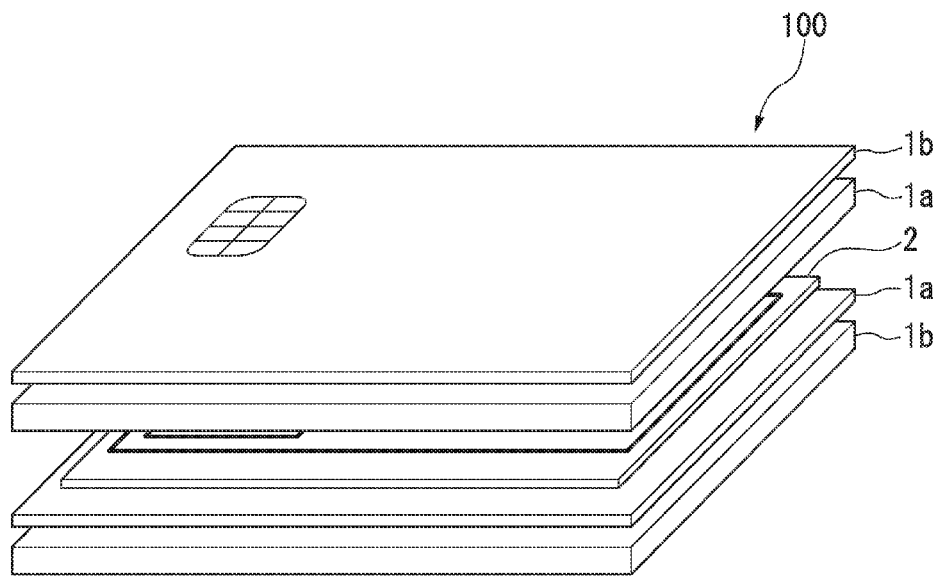
FIG. 3A is a cross-sectional view schematically showing an example of a composite IC card according to an embodiment of the present invention.
Figure 3B:
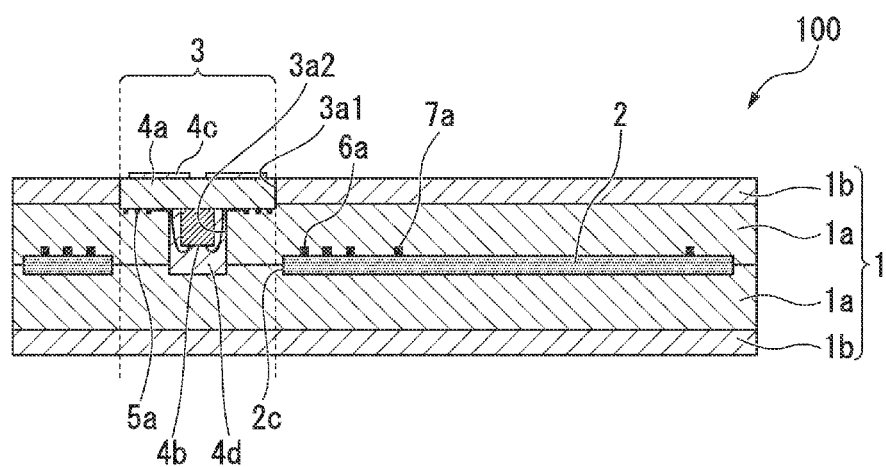
FIG. 3B is a cross-sectional view schematically showing an example of a composite IC card according to an embodiment of the present invention.

Then, the composite IC module 4 is embedded in and adhered to the recess 3a of the card base to complete the composite IC card 100 shown in FIGS. 3A and 3B.

In the composite IC card 100 according to the present embodiment, the second coupling coil 6a formed on the antenna sheet 2 is arranged outside the recess region 3 formed in the card base 1.

When employing milling, cutting work, or the like in which the card base 1 is cut using a cutting tool to form the recess 3a, if the second coupling coil 6a is arranged inside the recess region 3, depending on the accuracy of the processing machine in the depth and transverse direction, it will be possible that the cutting tool reaches the second coupling coil 6a to disconnect the second coupling coil 6a or, even if no disconnection is occurred, desired characteristics are not obtained because of deformation of the second coupling coil 6a due to the strain of the antenna sheet.

In the present embodiment, since the second coupling coil 6a is arranged outside the recess region 3, it is possible to prevent the above-described disconnection and the deformation of the coil.

In addition, as shown in FIG. 1, it may be arranged such that the end portion 2c of the antenna sheet 2 is arranged outside the recess region 3. In this case, it is possible to securely prevent damages and deformation of the end portion 2c of the antenna sheet 2 in milling, cutting work, or the like for cutting card base 1 to form the recess 3a. Specifically, it is possible to securely prevent the deformation of the second coupling coil 6a due to damages, deformation, or the like of the end portion 2c of the antenna sheet 2 and also prevent the resultant deterioration of the characteristics of the second coupling coil 6a.

The recess 3a of the recess region 3 may be constituted by the first recess 3a1 formed in the vicinity of the surface of the card base and the second recess 3a2 communicated with the first recess 3a1 and being less in opening width than the first recess 3a1 as shown in FIG. 1. In the example of FIG. 1, the size of the first recess 3a1 corresponds to the size of the module substrate 4a shown in FIG. 2, while the size of the second recess 3a2 corresponds to the size of the sealing resin 4d shown in FIG. 2. In the example of FIG. 1, the antenna sheet 2 is arranged outside the opening of the first recess 3a1.

Figure 2:
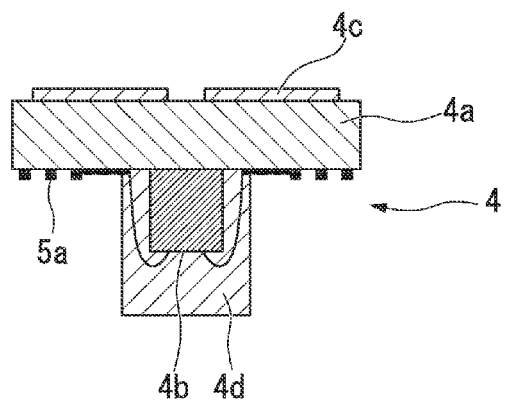
FIG. 2 is a cross-sectional view schematically showing an example of a composite IC module according to an embodiment of the present invention.

Additionally, in the example of FIG. 1, the first recess 3a1 and the second recess 3a2 are formed such that the center axis of the first recess 3a1 is substantially in conformity with the center axis of the second recess 3a2 in the depth direction so as correspond to the IC module 4 shown in FIG. 2. However, the shape and size of the recess 3*a* is not limited to that mentioned above and may be changed in accordance with the shape and size of the IC module 4 to be embedded in the card base 1.

Figure 9A:
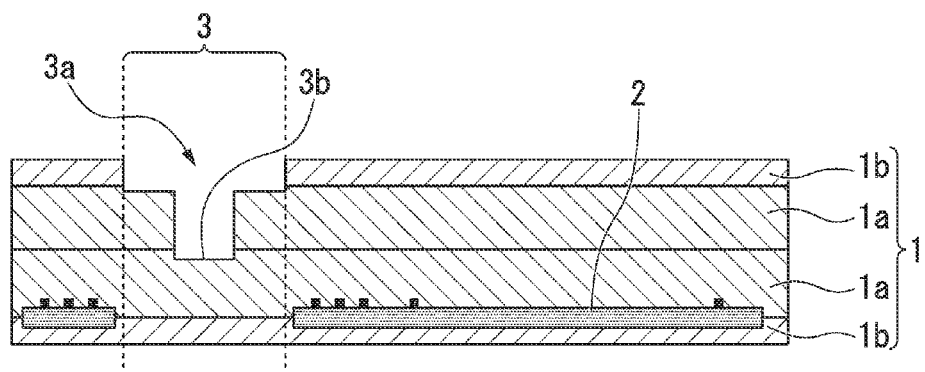
FIG. 9A is a cross-sectional view schematically showing another example of a card base and an antenna sheet of a composite IC card according to an embodiment of the present invention.
Figure 9B:
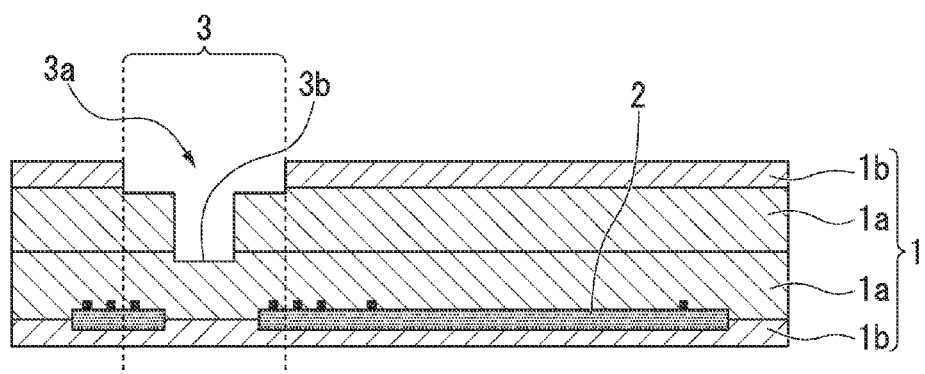
FIG. 9B is a cross-sectional view schematically showing another example of a card base and an antenna sheet of a composite IC card according to an embodiment of the present invention.

It is noted that the second coupling coil 6*a* may be formed at a position deeper than the depth of the recess 3*a* (i.e., bottom face 3*b* of the recess 3*a*) formed in the recess region 3 as shown in FIGS. 9A and 9B.

According to this configuration, influence of milling or cutting work exerting on the second coupling coil 6*a* will be reduced, and thus it is possible to prevent disconnection and deformation of the second coupling coil 6*a*. According to the configuration in which the second coupling coil 6*a* of the antenna sheet 2 is arranged outside the recess region 3 as shown in FIG. 9A, it is possible to further securely prevent disconnection and deformation of the second coupling coil 6*a*. Moreover, as far as arranging the second coupling coil 6*a* of antenna sheet 2 at a position sufficiently deeper than the bottom face 3*b* of the recess 3*a*, even in the configuration in which part of the second coupling coil 6*a* is arranged inside the recess region 3 as shown in FIG. 9B, it is possible to prevent disconnection and deformation of the second coupling coil 6*a*.

Figure 11A:
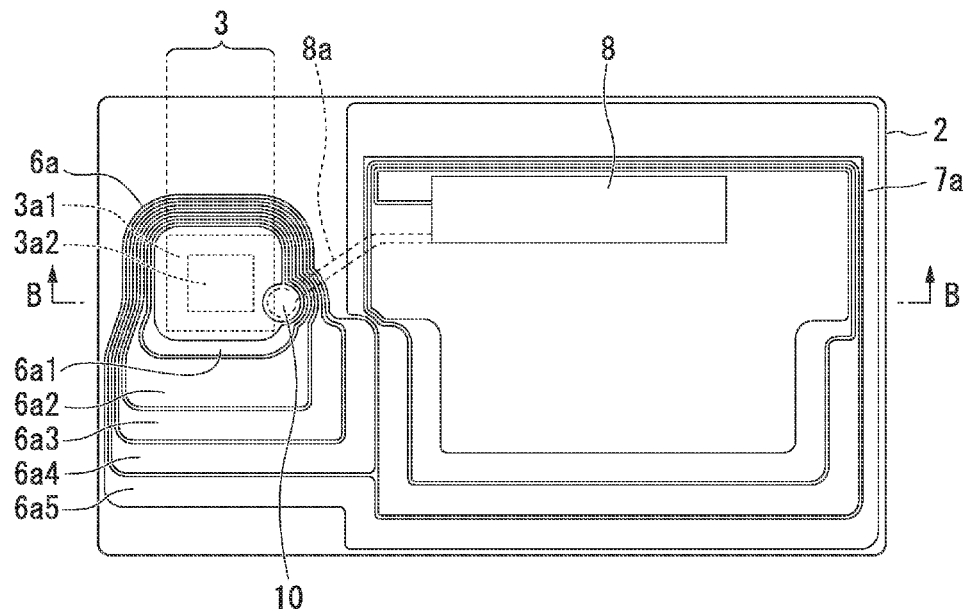
FIG. 11A is a plan view schematically showing another example of an antenna sheet according to an embodiment of the present invention.
Figure 11B:
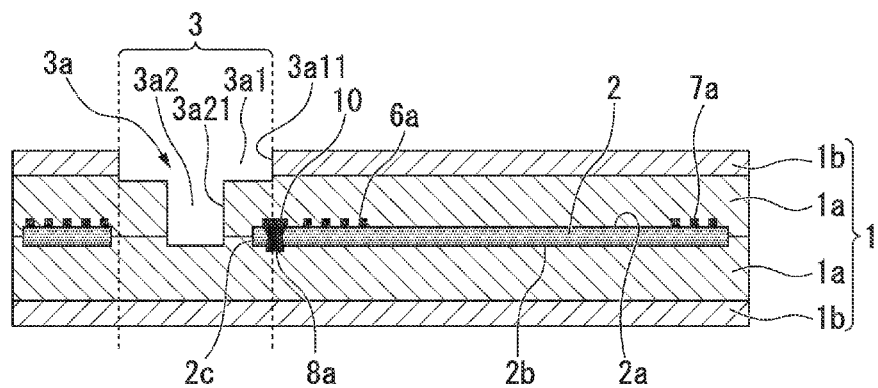
FIG. 11B is a cross-sectional view taken along line B-B line of FIG. 11A.

As shown in FIGS. 11A and 11B, the connection land 10 connecting the second coupling coil 6*a* with the wiring 8*a* of the capacitive element 8 may be arranged inside the recess region 3. In the examples of FIGS. 11A and 11B, part of the connection land 10 is arranged between the side wall 3*a*11 of the first recess 3*a*1 and the side wall 3*a*21 of the second recess 3*a*2. Specifically, part of the connection land 10 is arranged inside the first recess 3*a*1 and outside the second recess in a plan view. The whole of the connection land 10 may be arranged inside the first recess 3*a*1 and outside the second recess in a plan view.

The connection land 10 is formed to have width greater than the line width of the coil forming the second coupling coil 6*a* in a plan view, in order to securely achieve the above-described connection between the second coupling coil 6*a* and the capacitive element 8. For this reason, even when the connection land 10 is arranged inside the recess region 3, it is less likely to be subjected to disconnection and deformation due to milling, cutting work, or the like used to form the recess region 3.

Further, when arranging the connection land 10 inside the recess region 3, it will be possible to put the second coupling coil 6*a* closer to the recess region 3. Specifically, it will be possible to shorten the distance between the second coupling coil 6*a* and the first coupling coil 5*a* of the IC module 4 arranged inside the recess region 3. As a result, it will be possible to further improve the coupling between the second coupling coil 6*a* and the first coupling coil 5*a*.

For the connection between the second coupling coil 6*a* and the capacitive element 8 at the connection land 10, swaging, resistance welding, laser welding, or the like may be employed.

When employing swaging with a working area of about 1-3 mm diameter, it is preferable that the diameter of the connection land 10 be 3-5 mm with considering the accuracy of the processing. When employing resistance welding with a working area of about 0.5-1.5 mm diameter, it is preferable that the diameter of the connection land 10 be 2-4 mm with considering the accuracy of the processing. When employing laser welding with a working area of about 0.5-1.5 mm diameter, it is preferable that the diameter of the connection land 10 be 2-4 mm in view of the accuracy of the processing. It should be noted that, when employing laser welding, welding may be performed by irradiating laser to multiple points in the connection land 10 to improve the reliability of the connection between the second coupling coil 6*a* and the capacitive element 8.

It should be noted that the width of the connection land 10 is, for example, several to several tens of times the line width of the adjacent second coupling coil 6*a* for the above-described reason in processing. Therefore, in the case of the whole of the connection land 10 being arranged outside the recess region 3, the distance between the second coupling coil 6*a* adjacent to the connection land 10 and the first coupling coil 5*a* of the IC module 4 arranged inside the recess region 3 will be longer in comparison with the case of the connection land 10 being arranged inside the recess region 3, and thus the electromagnetic coupling between the second coupling coil 6*a* and the first coupling coil 5*a* will be weaker.

As shown in FIG. 5, the second coupling coil region 6 including the second coupling coil 6*a* may be arranged outside the antenna coil region 7 which includes the antenna coil 7*a*, or the second coupling coil region 6 may be arranged inside the antenna coil region 7 as shown in FIG. 6.

The position of the contact terminal of the IC module defined by ISO limits the number of turns in the second coupling coil region 6, which makes it difficult to improve its characteristics. However, in the configuration in which the second coupling coil region 6 is arranged outside the antenna coil region 7, it is possible to ensure the degree of freedom in designing the number of turns in the second coupling coil region 6. It noted that, in the case of the second coupling coil region 6 being arranged inside the antenna coil region 7, although the degree of freedom in designing the number of turns in the second coupling coil region 6 will decrease, the area of the antenna coil will increase. In this case, the communication characteristics of the antenna will be improved.

Figure 7:
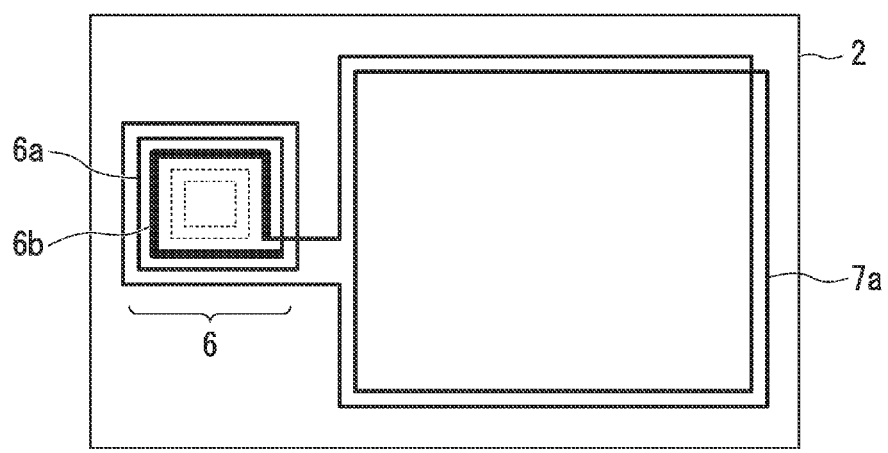
FIG. 7 is a plan view schematically showing another example of an antenna sheet according to an embodiment of the present invention.

Moreover, as shown in FIG. 7, the width of the innermost coil turn 6*b* of the second coupling coil 6*a* may be greater than the width of the other turns. When increasing the width of the innermost coil turn, it will be possible to prevent disconnection and deformation of the second coupling coil 6*a* when forming the recess region 3. The width of the innermost coil turn is not particularly limited but is preferably 1.2-5 times as the width of the other turns. If the width of the innermost coil turn is less than the above, the obtained effects will be smaller, and if it is greater than the above, the number of turns of the coil cannot be increased. It is more preferable that the width of the innermost coil turn be 1.5-3 times the width of the other turns.

As shown in FIG. 11A, of the coil turn formed in the innermost of the second coupling coil 6*a*, the line width of a coil turn portion 6*a*1 formed in the lower part may be greater than the other portions. When the composite IC card 100 is bent, it is likely that the stress will concentrate on the edge of the recess 3*a* and cause disconnection at the coil turn formed in the innermost of the second coupling coil 6*a*. In particular, the curvature in the vicinity of the coil turn portion 6*a*1 which is formed along the longitudinal direction of the composite IC card 100 and closest to the center of the composite IC card 100 in the short-length direction will be greatest when the composite IC card 100 is bent. For this reason, in view of the manufacturing accuracy, it is preferable that the line width of the coil turn portion 6*a*1 be greater than the other portions.

It should be noted that when a coil turn portion formed in the upper part of the coil turn formed in the innermost of the second coupling coil 6*a* is arranged much closer to the center of the composite IC card 100 in the short-length direction, the line width of the coil turn portion formed in the upper part may be greater than that of the other portions.

Figure 8A:
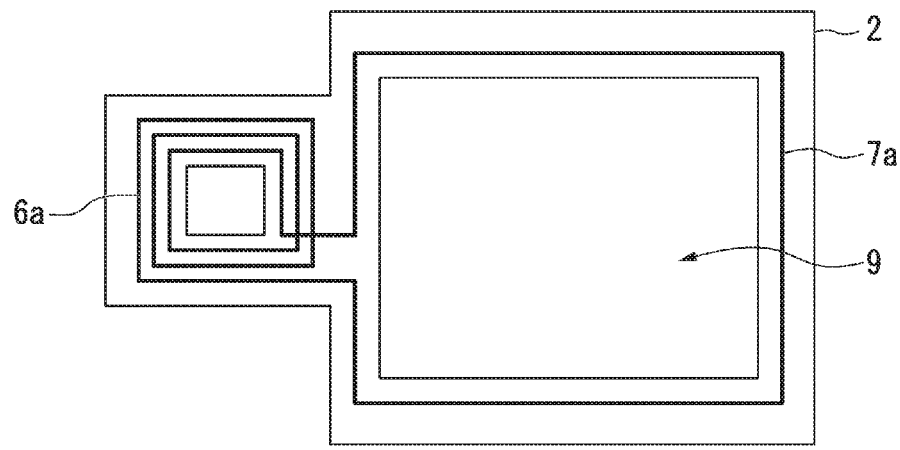
FIG. 8A is a plan view schematically showing another example of an antenna sheet according to an embodiment of the present invention.
Figure 8B:
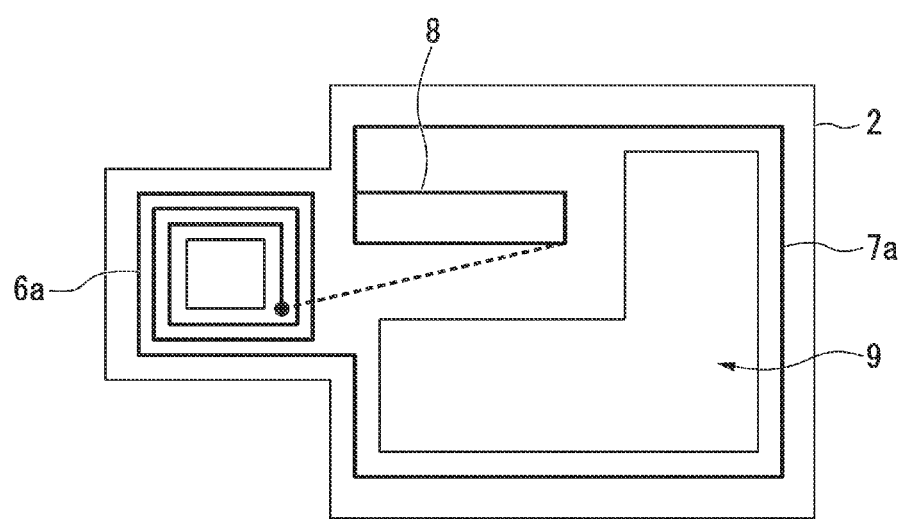
FIG. 8B is a plan view schematically showing another example of an antenna sheet according to an embodiment of the present invention.

Further, as shown in FIGS. 8A and 8B, it may be possible to punch out the part where the second coupling coil 6a of the antenna sheet 2 and the capacitive element 8 are not formed. In this case, when laminating the card base 1 and the antenna sheet 2 together by thermal lamination, both of the bases sandwiching the antenna sheet 2 will be fused together through a punched part 9 of the antenna sheet 2, and thus be strongly laminated together. More specifically, it is sometimes unlikely that PET, PEN, or the like which are used for the base of the antenna sheet 2 is fused to the card base 1. Therefore, when laminating the antenna sheet 2 without the above-described punched part 9 and the card base 1 together by thermal lamination, the antenna sheet 2 and the base adjacent to the antenna sheet 2 may not be sufficiently fused together and the antenna sheet 2 may be separated from the card base 1 when the obtained composite IC card 100 is bent.

Further, although it is not shown in the figures, it may be possible to form a magnetic stripe and perform an embossing process or the like on the composite IC card 100 according to the present embodiment. It is preferable that the region in which a magnetic stripe is formed and the region in which an embossing process is performed do not overlap the antenna coil 7a.

Further, the composite IC card 100 according to the present embodiment may be provided with a functional layer to which a functional transfer foil such as a picture layer and hologram is transferred.

It should be noted that, when performing a embossing process to print characters on the surface of the composite IC card 10, for example, the line width of the coil turn portions 6a2, 6a3, 6a4, and 6a5 formed below the coil turn portion 6a1 may be greater than that of the other portions as shown in FIG. 11A.

In this case, it is preferable that the line width of a coil turn portion provided at a position corresponding to a region in which characters are printed be greater than the height of the characters printed by the embossing process. More specifically, the height of characters printed on the surface of the composite IC card 10 is defined by the standard to 3 mm or 5 mm depending on the regions in which characters are formed. Therefore, it is preferable that the line width of a coil turn portion provided at a position corresponding to a region in which characters are printed be equal to or greater than 3 mm, or equal to or greater than 5 mm depending on regions in which characters are formed.

It should be noted that when using a winding coil as the second coupling coil 6a, it is preferable that the coil be arranged so as to avoid such regions in which characters are printed as described above.

EXAMPLES

As the base, polyethylene terephthalate with a thickness of 80 μm provided with an aluminum thin film formed on both sides thereof was used. The second coupling coil 6a, the antenna coil 7a, and part of the capacitive element 8 were formed on one face of the base by etching, and the remaining part of the capacitive element 8 and a jumper line were formed on the other face of the base by etching to obtain the antenna sheet 2. The second coupling coil 6a and the antenna coil 7a were formed so as to make their line width be 1 mm. The second coupling coil region 6 were arranged outside the antenna coil region 7. The second coupling coil 6a was formed so as to make the number of turns be three turns, and the antenna coil 7a was formed so as to make the number of turns be one turn. In addition, the second coupling coil 6a was arranged such that the innermost turn of the second coupling coil region 6 was arranged outside the recess region of the card base. Further, the second coupling coil 6a was formed so as to make the line width of the innermost turn in the second coupling coil region 6 be 2 mm.

Moreover, punching was performed to the part in which the second coupling coil 6a, the antenna coil 7a, and the like were not formed.

The card base 1 which is constituted by: two-layer core base(s) 1a made from polyvinyl chloride (PVC) with a thickness of 0.6 mm; and exterior films 1b made from amorphous polyester with a thickness of 0.1 mm and provided on both sides of the core base was prepared. The above-described antenna sheet 2 is sandwiched between the core bases 1a, and then they are laminated together by thermal lamination at a temperature of 100-120° C. to fabricate the card base 1.

Next, the recess region 3 is formed in the card base 1 by milling, the region having the recess 3a formed in two-tier shape and having an opening of 12 mm×15 mm. The IC module 4 was arranged in the recess 3a using a pickup apparatus, and the IC module 4 was mounted to the card base 1 by thermal pressing to obtain the composite IC card 100. As the IC module 4, an IC module for use in both contact and non-contact mode to which the first coupling coil 5a were formed was used. In addition, the first coupling coil 5a was formed so as to make the number of turns be three turns.

The IC module 4 was detached from the obtained composite IC card 100 and the innermost turn of the second coupling coil 6a was observed. It was found that no disconnection, deformation, or the like occurred in the second coupling coil 6a.

According to some aspects of the present invention, in a composite IC card which includes an IC module configured to be operated in both a contact mode and a non-contact mode and including a coil, a coil provided in the card base used to make an electrical coupling with the coil formed in the IC module in an non-contact manner, and an antenna coil used to perform a non-contact communication with external terminals, it possible to reduce defectiveness due to disconnection, deformation, and the like of the coil used to make an electrical connection with the coil of the IC module.

What is claimed is:

1. A composite IC card comprising:
a card base having a recess;
an antenna sheet arranged inside the card base;
an IC module arranged in the recess of the card base, wherein
the IC module comprises an IC chip having both a contact communication function and a non-contact communication function, a module substrate provided with an external terminal which is a contact communication element, and a first coupling coil which is a non-contact communication mechanism,
the antenna sheet comprises an antenna coil configured to perform reception of electric power and transmission and reception of signals with an external reader, and a second coupling coil connected to the antenna coil,
the first coupling coil and the second coupling coil are arranged so as to be capable of achieving close coupling therebetween and configured to couple the IC module with the antenna sheet in a non-contact manner by trans coupling,
the second coupling coil of the antenna sheet is arranged outside a region in which the recess of the card base is formed,
the antenna sheet further comprises a capacitive element connected to the second coupling coil and the antenna coil, the second coupling coil is formed on a front surface of the antenna sheet, the antenna sheet further comprises a connection land connecting the second coupling coil with a wiring formed on a rear surface of the antenna sheet and drawn from the capacitive element, and the connection land is arranged inside the region in which the recess of the card base is formed.

2. The composite IC card according to claim 1, wherein the second coupling coil is formed from a coil having a plurality of turns, and the innermost turn of the coil is greater in line width than the other turns of the coil.

3. The composite IC card according to claim 1, wherein the recess of the card base is constituted by a first recess formed in the vicinity of a surface of the card base and a second recess communicating with the first recess and being less in opening width than the first recess, and the connection land is arranged between a side wall of the first recess and a side wall of the second recess.

4. The composite IC card according to claim 1, wherein the width of the connection land is greater than the line width of the second coupling coil in a plan view.

5. The composite IC card according to claim 1, wherein the antenna sheet is arranged in a position deeper than a bottom face of the recess of the card base.

6. A composite IC card comprising:

a card base having a recess;

an antenna sheet arranged inside the card base;

an IC module arranged in the recess of the card base, wherein the IC module comprises an IC chip having both a contact communication function and a non-contact communication function, a module substrate provided with an external terminal which is a contact communication element, and a first coupling coil which is a non-contact communication mechanism, the antenna sheet comprises an antenna coil configured to perform reception of electric power and transmission and reception of signals with an external reader, and a second coupling coil connected to the antenna coil, the first coupling coil and the second coupling coil are arranged so as to be capable of achieving close coupling therebetween and configured to couple the IC module with the antenna sheet in a non-contact manner by trans coupling, the second coupling coil of the antenna sheet is arranged outside a region in which the recess of the card base is formed, the second coupling coil is formed from a coil having a plurality of turns, and the innermost turn of the coil is greater in line width than the other turns of the coil.

* * * * *